US012655285B2

(12) United States Patent
Bohling et al.

(10) Patent No.: US 12,655,285 B2
(45) Date of Patent: Jun. 16, 2026

(54) AQUEOUS DISPERSION OF MULTISTAGE ACRYLIC MICROSPHERES

(71) Applicant: Rohm and Haas Company, Collegeville, PA (US)

(72) Inventors: James C. Bohling, Lansdale, PA (US); Ibrahim Eryazici, Phoenixville, PA (US); Christopher Kozak, Audubon, PA (US); Partha S. Majumdar, Harleysville, PA (US); Johnpeter N. Ngunjiri, Gilbertsville, PA (US)

(73) Assignee: Rohm and Haas Company, Collegeville, PA (US)

( * ) Notice: Subject to any disclaimer, the term of this patent is extended or adjusted under 35 U.S.C. 154(b) by 810 days.

(21) Appl. No.: 17/917,307

(22) PCT Filed: Mar. 22, 2021

(86) PCT No.: PCT/US2021/023444
§ 371 (c)(1),
(2) Date: Oct. 6, 2022

(87) PCT Pub. No.: WO2021/211263
PCT Pub. Date: Oct. 21, 2021

(65) Prior Publication Data
US 2023/0159741 A1 May 25, 2023

Related U.S. Application Data

(60) Provisional application No. 63/009,518, filed on Apr. 14, 2020.

(51) Int. Cl.
*C08F 220/18* (2006.01)
*C08K 3/22* (2006.01)
*C08L 51/00* (2006.01)

(52) U.S. Cl.
CPC ...... *C08L 51/003* (2013.01); *C08F 220/1804* (2020.02); *C08K 2003/2241* (2013.01)

(58) Field of Classification Search
CPC ........................ C08L 51/003; C08F 220/1804; C08F 220/14; C08F 265/06; C08F 285/00; C09D 5/006; C09D 5/024; C09D 5/028; C09D 5/1637; C09D 7/42; C09D 7/69; C09D 7/70; C09D 133/14
USPC ........................................ 523/201
See application file for complete search history.

(56) References Cited

U.S. PATENT DOCUMENTS

| | | |
|---|---|---|
| 9,518,192 B2 | 12/2016 | Bohling et al. |
| 2016/0369359 A1 | 12/2016 | Gallagher et al. |
| 2019/0177554 A1 | 6/2019 | Bohling et al. |
| 2019/0185687 A1 | 6/2019 | Bohling et al. |

FOREIGN PATENT DOCUMENTS

| | | |
|---|---|---|
| EP | 1944342 A1 | 7/2008 |
| EP | 3299400 A1 | 3/2018 |

OTHER PUBLICATIONS

Gurgel et al., A Comprehensive Review on Core-Shell Polymeric Particles for Enzyme Immobilization, (Year: 2022).*

* cited by examiner

*Primary Examiner* — Hannah J Pak
*Assistant Examiner* — Doris Ling

(57) ABSTRACT

The present invention relates to an aqueous dispersion of polymeric microspheres with a high surface Young's modulus and a relatively low core Young's modulus. The dispersion of the present invention is useful in paint formulations for providing improving hydrophobic stain resistance, for example, resistance to lipstick.

6 Claims, 6 Drawing Sheets

FIG. 1

AQUEOUS DISPERSION OF MULTISTAGE ACRYLIC MICROSPHERES

BACKGROUND OF THE INVENTION

The present invention relates to an aqueous dispersion of multistage acrylic microspheres, more particularly microspheres having a hard shell and a soft rubbery core. The composition of the present invention is useful in matte paint formulations for improving hydrophilic stain resistance.

It is highly desirable to have the performance attributes of a semi-gloss coating with the sheen of a traditional matte coating. Matte coatings are desirable for their ability to obscure surface imperfections in both a substrate and the coating covering it. The control of gloss is critical in the design of low sheen decorative paints. Traditionally, lower sheen paints control the gloss by the addition of matting agents, also known as extenders or dulling agents.

Traditionally, these matting agents have been inorganic particles of calcium carbonate, silica, and the like, that lower the sheen by increasing the surface roughness of the film. The overall roughness of the film significantly increases the degree of light scattering, which, in turn lowers the sheen of the overall film. While effective at reducing the sheen, the inorganic particles compromise the durability and performance of the resulting film. Properties such as stain resistance can be particularly compromised through the use of large inorganic extenders.

Recently, investigators have reported advances in durable matte formulations through the replacement of inorganic extenders with polymeric microsphere matting agents. Advances in burnish resistance, scrub resistance, and hydrophilic stain resistance have been reported with formulations containing polymeric microspheres (See US 2019/0185687 and US 2019/0177554) as well as improvements in achieving defect free coatings with low coefficients of friction (application. Ser. No. 16/782,324). Nevertheless, preparing matte finishes with hydrophobic stain resistance to lipstick has remained elusive. It would therefore be an advance in the field of durable matte paints to provide a formulation that produces a matt finish with significantly improved hydrophobic stain resistance.

SUMMARY OF THE INVENTION

The present invention addresses a need in the art by providing, in one aspect, a composition comprising an aqueous dispersion of polymeric microspheres comprising a shell and a core, wherein:

a) the microspheres have a $D_{50}$ particle size in the range of from 6 μm to 20 μm;

b) the shell comprises at least 50% by weight structural units of MMA, and has a surface Young's modulus at 25° C. in the range of from 200 MPa to 1500 MPa;

c) the core comprises i) from 0 to 59 weight percent structural units of a hydrophobic monomer which is a $C_7$-$C_{30}$-alkyl acrylate or $C_7$-$C_{30}$-alkyl methacrylate; ii) from 1 to 10 weight percent structural units of a crosslinking monomer; iii) from 40 to 99 weight percent structural units of one or more $C_1$-$C_4$-alkyl acrylates; and iv) less than 5 weight percent structural units of a carboxylic acid monomer; wherein the core has a Young's modulus at 25° C. in the range of from 1 MPa to less than 30 MPa;

d) the weight-to-weight ratio of the core to the shell is in the range of from 9:1 to 7:3; and e) the shell thickness of the microspheres is in the range of from 0.2 μm to 1.0 μm.

The composition of the present invention is useful in paint formulations for providing improving hydrophobic stain resistance, for example, resistance to lipstick.

BRIEF DESCRIPTION OF DRAWINGS

FIG. 1 illustrates a cross-section of an inventive microsphere analyzed by atomic force microscopy.

DETAILED DESCRIPTION OF THE INVENTION

Figure 2A:
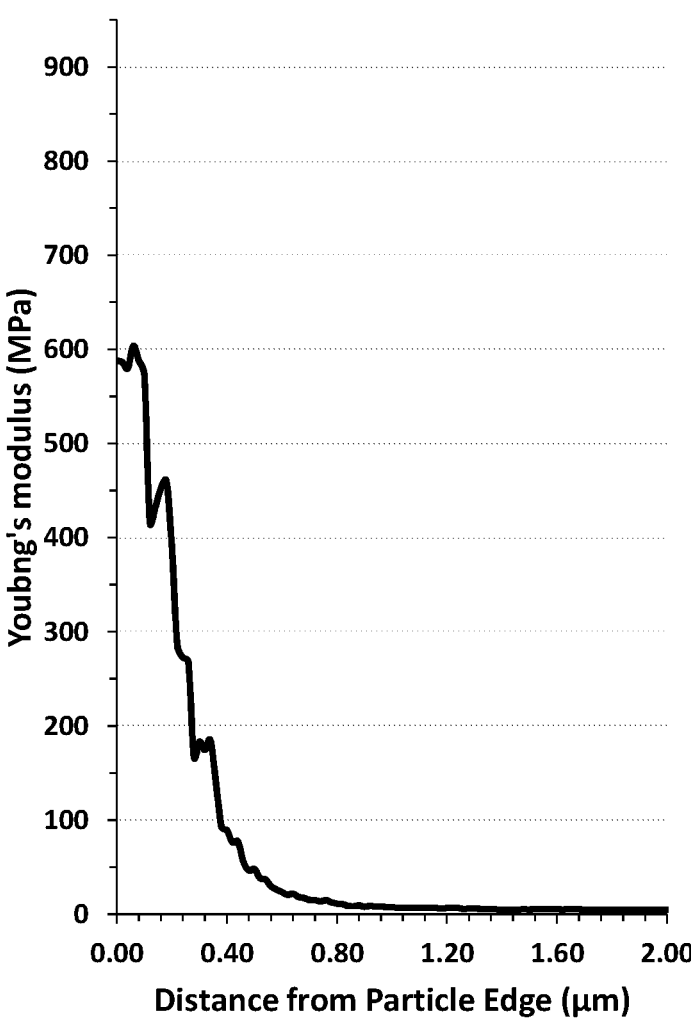
FIGS. 2A-2E illustrate the Young's Modulus in megapascal (MPa) vs. distance from the particle edge.

In one aspect, the present invention is a composition comprising an aqueous dispersion of polymeric microspheres comprising a shell and a core, wherein:

a) the microspheres have a $D_{50}$ particle size in the range of from 6 μm to 20 μm;

b) the shell comprises at least 50% by weight structural units of MMA, and has a surface Young's modulus at 25° C. in the range of from 200 MPa to 1500 MPa;

c) the core comprises i) from 0 to 59 weight percent structural units of a hydrophobic monomer which is a $C_7$-$C_{30}$-alkyl acrylate or $C_7$-$C_{30}$-alkyl methacrylate; ii) from 1 to 10 weight percent structural units of a crosslinking monomer; iii) from 40 to 99 weight percent structural units of one or more $C_1$-$C_4$-alkyl acrylates; and iv) less than 5 weight percent structural units of a carboxylic acid monomer; wherein the core has a Young's modulus at 25° C. in the range of from 1 MPa to less than 30 MPa;

d) the weight-to-weight ratio of the core to the shell is in the range of from 9:1 to 7:3; and e) the shell thickness of the microspheres is in the range of from 0.2 μm to 1.0 μm.

The polymeric microspheres have a median weight average ($D_{50}$) particle size in the range of from 6 μm, preferably from 8 μm, more preferably from 10 μm, to 20 μm, preferably to 15 μm, as measured by a Disc Centrifuge Photosedimentometer (DCP). The polymeric microspheres preferably have a coefficient of variation (CV) in the range of from 30% to 60%, more preferably to 50%, and most preferably to 40%.

The polymeric microspheres are characterized by having a relatively thin shell with a high Young's modulus and a rubbery core with a relatively low Young's modulus. The surface Young's modulus is in the range of from 200, preferably from 500, more preferably from 600, and most preferably from 750 MPa, to 1500, more preferably to 1200, and most preferably to 1000 MPa. As used herein, surface Young's modulus refers to the maximum Young's modulus measured within 100 nm of the surface of the microspheres.

The Young's modulus of the core is in the range of from 1 MPa to 20 MPa, more preferably to 15 MPa. As used herein core Young's modulus refers to the Young's modulus measured beyond 1 μm from the surface of the microspheres. Young's modulus was calculated using a PeakForce quantitative nanomechanical mapping (PF-QNM) technique in atomic force microscopy (AFM). Shell thickness is, by definition, where the Young's modulus drops below 30 MPa from the surface toward the center of the microsphere.

The weight-to-weight ratio of the core to the shell is in the range of from 9:1, preferably from 8.5:1.5, to 7:3, preferably to 7.5:2.5.

The shell comprises from at least 50 weight percent, preferably from at least 75, more preferably from at least 90, and most preferably at least 95 weight percent, up to 100 weight percent structural units of methyl methacrylate (MMA). The shell also preferably comprises less than 1, more preferably less than 0.1, more preferably less than 0.01, and most preferably 0 weight percent structural units of phosphoethyl methacrylate (PEM). Preferably the glass transition temperature ($T_g$) of the shell, as calculated using the Fox equation, is in the range of from 60° C., more preferably from 80° C., more preferably from 95° C., and most preferably from 100° C., to preferably 140° C., more preferably to 120° C., and most preferably to 110° C.

The core comprises, based on the weight of the core, from 0, preferably from 0.2, more preferably from 0.5 weight percent, to 59, preferably to 20, more preferably to 10, and most preferably to 5 weight percent structural units of a hydrophobic monomer which is a $C_7$-$C_{30}$ alkyl acrylate or $C_7$-$C_{30}$ alkyl methacrylate. Examples of suitable hydrophobic monomers include 2-ethylhexyl acrylate (2-EHA), lauryl methacrylate (LMA), stearyl methacrylate (SMA), and behenyl methacrylate (BEMA).

The core further comprises, based on the weight of the core, from 1, and more preferably from 2 weight percent to 10, preferably to 8, and more preferably to 6 weight percent structural units of a crosslinking monomer. As used herein, a crosslinking monomer is a multiethylenically unsaturated monomer, preferably a di- or triethylenically unsaturated monomer, examples of which include allyl methacrylate (ALMA), diallyl maleate, trimethylolpropane trimethacrylate, ethylene glycol dimethacrylate, butylene glycol dimethacrylate, and divinyl benzene.

The core further comprises, based on the weight of the core, from 50, preferably from 60, more preferably from 80, and most preferably from 90 weight percent, to 98, preferably to 95 weight percent structural units of one or more $C_1$-$C_4$-alkyl acrylate monomers, preferably methyl acrylate, ethyl acrylate, or n-butyl acrylate or a combination thereof. A preferred acrylate monomer is n-butyl acrylate.

The core comprises less than 5, preferably less than 4.5, more preferably less than 2, more preferably less than 1, and most preferably 0 weight percent structural units of a carboxylic acid monomer such as acrylic acid and methacrylic acid.

The core also preferably comprises less than 1, more preferably less than 0.1, more preferably less than 0.01, and most preferably 0 weight percent structural units of phosphoethyl methacrylate (PEM).

The aqueous dispersion of microspheres can be prepared by the following general procedure: A first monomer emulsion (ME1) is advantageously prepared by emulsifying, in the presence of water and a stabilizing amount of a reactive or non-reactive surfactant, a hydrophobic monomer, and a crosslinking monomer such as ALMA. Sulfonates, reactive phosphates, and styryl phenols are especially suitable surfactants. ME1 preferably comprises at least 80 weight percent of an acrylate monomer, preferably n-butyl acrylate, based on the weight of monomers in the first monomer emulsion. ME1 is fed into a heated vessel, followed by addition of an emulsified mixture of an inhibitor such as 4-hydroxy 2,2,6,6-tetramethylpiperidine (4-hydroxy TEMPO) and a hydrophobic initiator such as t-butyl peroxy-2-ethylhexanoate and t-amyl peroxy-2-ethylhexanoate.

Once the polymerization of the monomers in ME1 is complete or nearly complete, a second monomer emulsion (ME2), which typically comprises from 90 to 99 weight percent ethyl acrylate or n-butyl acrylate and from 1 to 10 weight percent of ALMA, based on the weight of the monomers, dispersed in water along with an inhibitor and a suitable surfactant, is then fed into the heated vessel over time. After a suitable hold time, a neutralizing agent such as NH₄OH is added to the vessel.

$FeSO_4 \cdot 7H_2O$ and ethylene diamine tetrasodium salt are then advantageously added to the heated vessel, followed by the addition of a third monomer emulsion (ME3, preferably an aqueous emulsion of MMA), and a water-soluble redox pair such as t-butylhydroperoxide and isoascorbic acid. After the desired reaction is completed, residual monomers are advantageously chased with a redox pair.

The composition of the present invention is useful as a matting agent in paint formulations. Accordingly, in another aspect, the composition comprises one or more of the following components: binders, pigments, rheology modifiers, coalescents, defoamers, extenders, opaque polymers, and colorants. It has been discovered that the microspheres of the present invention are especially effective for improving lipstick stain resistance in durable matte paints.

EXAMPLES

DCP Particle Sizing Methods for Microspheres

Particle sizes and distribution were measured using Disc Centrifuge Photosedimentometer (DCP, CPS Instruments, Inc., Prairieville, LA) that separates modes by centrifugation and sedimentation through a sucrose gradient. The samples were prepared by adding 1 to 2 drops of the microsphere dispersion into 10 mL of deionized (DI) water containing 0.1% sodium lauryl sulfate, followed by injection of 0.1 mL of the sample into a spinning disc filled with 15 g/mL of sucrose gradient. A 2-8% sucrose gradient disc spinning at 3,000 rpm was used, and 9-μm polystyrene calibration standard was injected prior to injection of the sample. Median weight average ($D_{50}$) particle size and coefficient of variation (CV) were calculated using instrument's algorithm.

Sample Preparation for AFM

To achieve isolated cross-sectioned microspheres during cryo-microtomy, the microsphere dispersions of the Examples and the Comparative Example (prepared as described hereinbelow) were mixed with PRIMAL™ EC-2949 Acrylic Latex (A Trademark of The Dow Chemical Company or Its Affiliates) with a weight:weight of ratio of 1:5 (Dispersion:EC-2949). Samples were hand-cut, then placed into the microtome sample holder. The Leica EM FC7 microtome was used for block-facing outfitted with an AFM 35° C. cryo-knife, (Diatome, Hatfield PA). The settings used on the Leica Micro Systems were as follows: Speed=80 mm/s; Feed=60 nm; Step approach=0.1 μm; Temperature=−80° C. Block-facing or polishing of the sample surface was repeated until the surface were visually glass-like.

Young's Modulus Measurement by AFM Using PF-QNM

Samples were analyzed in PeakForce QNM which is based on PeakForce Tapping mode. In PeakForce Tapping, the probe was oscillated at a frequency (0.25-2 kHz) and a designated peak force (maximum nominal force applied to the sample) was used for feedback control. Each time the tip interacted with the sample, a force curve was collected and analyzed for nanomechanical properties. The resulting signals were extracted and displayed in real-time and applied to calculate Young's modulus using SPIP Image Processor Software (Image Metrology, Denmark.)

Force curves can also be acquired using the quasi static function which offers flexibility of curve placement on image and a toolbox of complex ramp parameter. Table 1 shows the parameters used in the examples discussed in this application.

TABLE 1

| Parameters for PFQNM force curve measurements. | | | |
|---|---|---|---|
| Imaging Parameter (PF QNM) | | Ramp Parameter (Quasi-static) | |
| Probe type | Tap 150 | Ramp size | 300 nm |
| Spring constant | 10.5 N/m | Ramp rate | 1 Hz |
| Deflection sensitivity | 49.5 nm/V | # of samples | 1024 |
| Probe radius | 12.23 nm | Trigger voltage | 0.032 V |
| Scan rate | 1 Hz | | |
| PF Setpoint | 10 nN | | |

For each sample, 200 force curves were acquired across the microsphere diameter. Force curves were measured every 35 nm from the edge of sliced particle to the center. The quasi-static force curves were triggered at 0.032 V. The applied force in each case can be calculated from the trigger voltage selected using Equation 1.

$$Applied\ force = Def.sens.\left(\frac{nm}{V}\right)\left(Spr.Const.\left(\frac{N}{m}\right)\right)*Trigger\ Volt(V).$$

Equation 1

Young's modulus was calculated according to Hertz spherical indentation model as shown in Equation 2.

$$F_{Hertz} = \frac{4}{3}\frac{E}{(1-v^2)}\sqrt{R_{tip}}(S_0-S)^{3/2}$$

Equation 2 where E is the Young's modulus measured at the point of contact of the tip, $v$ is the Poisson's ratio, $R_{tip}$ is the tip radius and $S_0$ is the point of zero indentation.

Example 1—Preparation of Dispersion of Microspheres with Stearyl Methacrylate in ME1

A first monomer emulsion (ME1) was prepared by mixing together deionized water (108 g), E-Sperse RS-1684 reactive surfactant (RS-1684, 4.24 g, 30% active), Rhodacal DS-4 branched alkylbenzene sulfonate (DS-4, 3.94 g, 22.5% solution), 4-hydroxy 2,2,6,6-tetramethylpiperidine (4-hydroxy TEMPO, 0.32 g, 5% aq.), n-butyl acrylate (BA, 215.0 g), SMA (25.0 g), and ALMA (10.0 g) in a flask.

An initiator emulsion was prepared by emulsifying in a separate vial, deionized water (0.7 g), DS-4 (1.9 g, 22.5% aq. solution), 4-hydroxy TEMPO (0.5 g. 5% aq. solution), and t-butyl peroxy-2-ethylhexanoate (TBPEH, 7.5 g, 98% active).

In a separate flask, deionized water (940 g) was added to a 5-L round bottom flask (reactor) fitted with a stirrer, condenser, and a temperature probe. The reactor was heated to 67° C., after which time ME1 was fed into the reactor over 10 min, followed by the addition of the initiator emulsion. After an induction period of 30 min, the resultant exotherm caused the reactor temperature to rise to 82° C.

A second monomer emulsion (ME2) was prepared by combining deionized water (540.0 g), RS-1684 (21.2 g, 30% active), DS-4 (19.7 g, 22.5% solution), 4-hydroxy TEMPO (1.0 g, 5% aq.), BA (1200.9 g), and ALMA (50.1 g), and fed into the reactor over 70 min After a 30-min hold, NH₄OH (1.1 g, 28% aq.) was fed into the reactor over 3 min.

Figure 1:
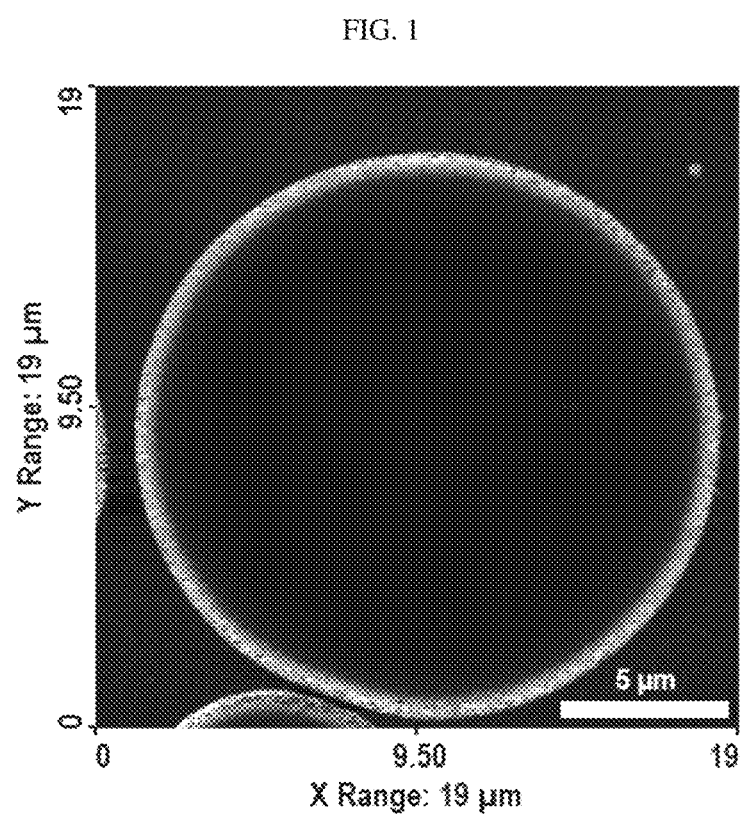

The reactor was cooled to and maintained at 72° C., after which time $FeSO_4 \cdot 7H_2O$ (14.9 g, 0.15% aq) and EDTA tetrasodium salt (2.7 g, 1% aqueous solution) were mixed and added to reactor. A third monomer emulsion (ME3) was prepared in a separate flask by combining deionized water (152.0 g), DS-4 (4.6 g, 22.5% solution), RS-1684 (6.4 g, 30% active), and MMA (375.0 g). ME3, t-butylhydroperoxide solution (t-BHP, 1.9 g (70% aq.) in 16.0 g water) and isoascorbic acid (IAA, 1.4 g in 16.0 g water) were fed into the reactor over 45 min. The residual monomers were then chased by feeding t-BHP (3.5 g (70% aq.) in 32 g water) and IAA (1.7 g in 32 g water) into the reactor over 20 min. The consequent dispersion was filtered through a 100-μm screen. The filtrate was analyzed for percent solids (46.7%), $D_{50}$ particle size (11.9 μm, as measured by DCP), and CV (33% as measured by DCP). FIG. 1 illustrates a cross-section of a microsphere of the present invention as prepared by this example. The light region at the edge of the microsphere represents the high Young's modulus shell, and the dark region represents the low Young's modulus core. The sharp distinction between the light region and the dark region is indicative of the sharp dropoff in Young's modulus at the interface between the shell phase and the core phase of the microsphere. FIG. 2A illustrates the Young's modulus (MPa) vs. distance (μm) from the particle edge of the microspheres as prepared in this example. The maximum Young's modulus was found to be 604 MPa at 0.06 μm from the surface.

Example 2—Preparation of Dispersion of Microspheres with 2-Ethylhexyl Acrylate in ME1

Figure 2B:
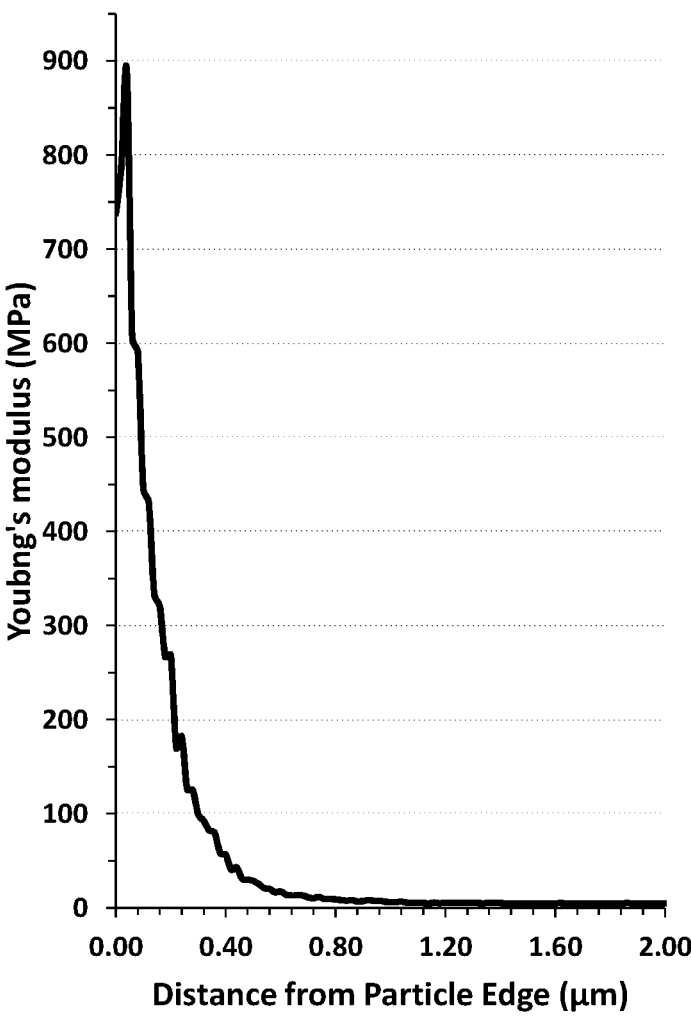

The process of was carried out essentially as described in Example 1 except that 2-EHA (25.0 g) was used in place of SMA in ME1. The final filtrate was analyzed for percent solids (46.6%), $D_{50}$ particle size (13.2 μm, as measured by DCP), and CV (37% as measured by DCP). FIG. 2B illustrates the Young's modulus (MPa) vs. distance (μm) from the particle edge of the microspheres as prepared in this example. The maximum Young's modulus was found to be 889 MPa at 0.04 μm from the surface.

Example 3—Preparation of Dispersion of Microspheres with Behenyl Methacrylate in ME1

Figure 2C:
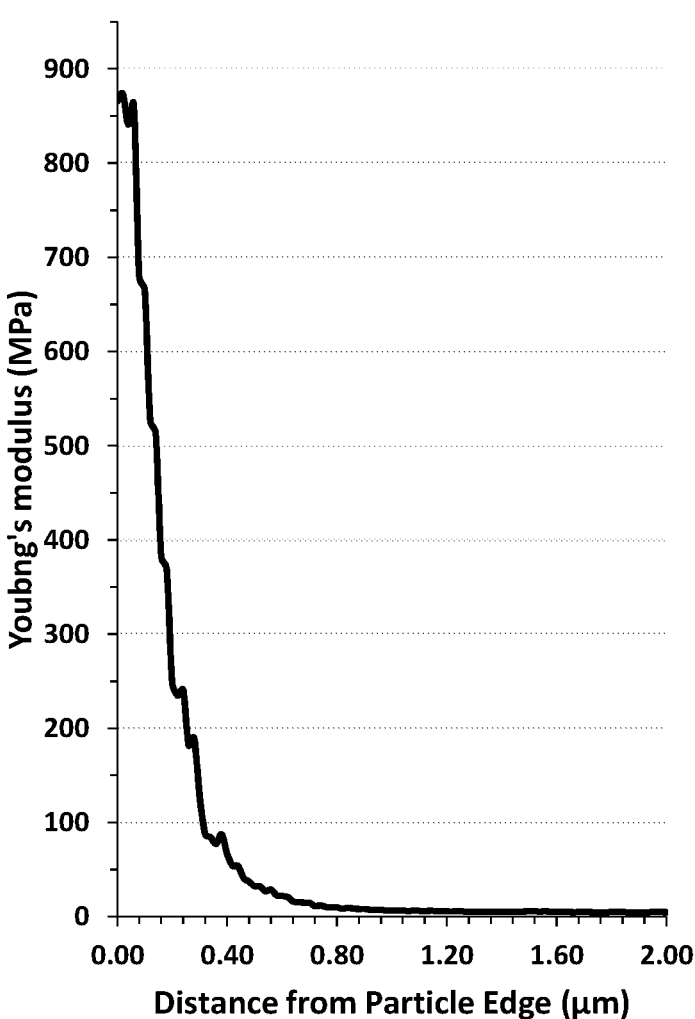

The process of was carried out essentially as described in Example 1 except that BEMA (25.0 g) was used in place of SMA in ME1. The final filtrate was analyzed for percent solids (46.6%), $D_{50}$ particle size (13.3 μm, as measured by DCP), and CV (33% as measured by DCP). FIG. 2C illustrates the Young's modulus (MPa) vs. distance (μm) from the particle edge of the microspheres as prepared in this example. The maximum Young's modulus was found to be 873 MPa at 0.02 μm from the surface.

Example 4—Preparation of Dispersion of Microspheres with Lauryl Methacrylate in ME1

Figure 2D:
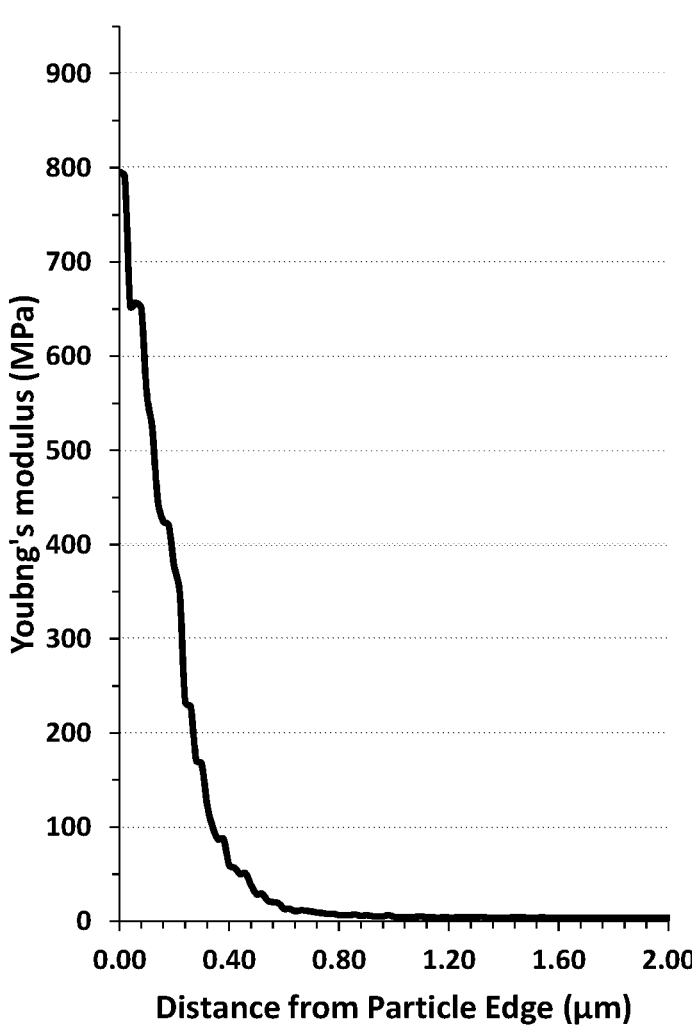

The process of was carried out essentially as described in Example 1 except that LMA (25.0 g) was used in place of SMA in ME1. The final filtrate was analyzed for percent solids (46.4%), $D_{50}$ particle size (14.5 μm, as measured by DCP), and CV (34% as measured by DCP). FIG. 2D illustrates the Young's modulus (MPa) vs. distance (μm)

from the particle edge of the microspheres as prepared in this example. The maximum Young's modulus was found to be 796 MPa at the surface.

Example 5—Preparation of Dispersion of Microspheres with No Hydrophobic Monomer in ME1

Figure 2E:
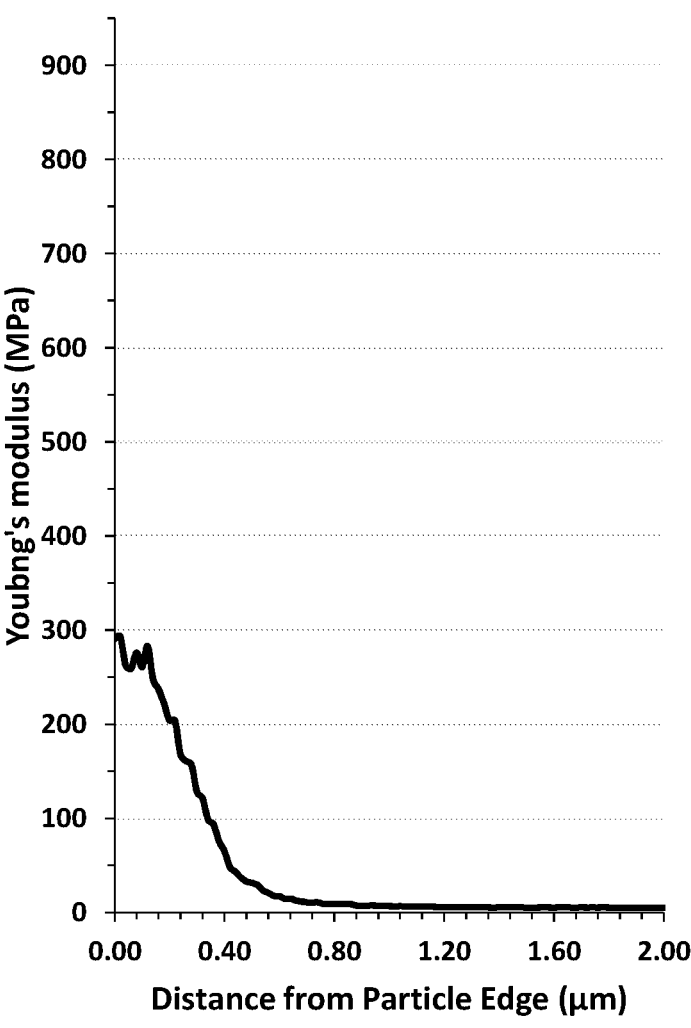

The process of was carried out essentially as described as in Example 1 except that n-butyl acrylate was used in place of SMA in ME1 (BA, 25.0 g). The final filtrate was analyzed for percent solids (46.5%), and $D_{50}$ particle size (11.2 μm, as measured by DCP), and CV (37% as measured by DCP). FIG. 2E illustrates the Young's modulus (MPa) vs. distance (μm) from the particle edge of the microspheres as prepared in this example. The maximum Young's modulus was found to be 293 MPa at 0.02 μm from the surface.

FIGS. 2A-2D illustrate a dramatic difference between the surface Young's modulus of the microspheres where the core comprises structural units of hydrophobic monomer as compared with the surface Young's modulus of the microspheres that do not contain structural units of the hydrophobic monomer in the core (FIG. 2E). FIGS. 2A-2E confirm the sharp dropoff in Young's modulus; in each instance the Young's modulus drops from above 290 MPa to less than 30 MPa at 0.55 μm beneath the surface of the microspheres.

Paint Formulations

Paint formulations were prepared as illustrated in Table 2. $TiO_2$ refers to Kronos 4311 $TiO_2$; Binder refers to a precomposite polymer substantially as described in U.S. Pat. No. 9,518,192, column 4, with a volume solids of 39%; Texanol refers to Texanol Coalescent; Byk-22 refers to Byk-22 defoamer; RM 2020 refers to ACRYSOL™ RM-2020-NPR Rheology Modifier; $NH_3$ refers to 28% aq. ammonia. Lipstick Stain refers to the household stain rating of lipstick removal in accordance with ASTM Method D4828. ACRYSOL is a Trademark of The Dow Chemical Company or Its Affiliates.

Stain Removal Test

The stain removal test was carried out in accordance with ASTM Method D4828: A single draw-down of each paint was made on a Black Vinyl Chart (Leneta Form P121-10N) using a 7-mil Dow bar and allowed to dry for 7 d at a controlled temperature and humidity (72° F./50% RH). After 7 d, lipstick stain (Covergirl Lipstick #305) was applied in a uniform fashion to all of the drawdowns. After application, the stains were allowed to stand for 2 h. The panels were then washed on a Gardco Washability and Wear Tester using a sponge loaded with 15 mL of water and 10 mL of Leneta standardized non-abrasive scrub medium (Item SC-1), which was placed into a boat equipped with a 100-g weight and run for 100 cycles. The drawdown was rinsed thoroughly and hung to dry. The stain removal performance was rated from 0 to 100. Rating of 0 means the color was similar to the applied stain on the section of panel that was not cleaned. A rating of 100 indicates the stain was completely removed. Table 2 shows the Lipstick Stain Rating for various paint formulations.

TABLE 2

| Paint Formulations with Matting Agents | | | | | |
|---|---|---|---|---|---|
| | Paint Ex. No. | | | | |
| | Paint Ex. 1 | Paint Ex. 2 | Paint Ex. 3 | Paint Ex. 4 | C. Paint Ex. 1 |
| $TiO_2$ (g) | 168.43 | 168.57 | 168.43 | 168.43 | 168.43 |
| Binder (g) | 198.68 | 199.35 | 198.73 | 198.42 | 198.93 |
| Example 1 (g) | 120.20 | 0.00 | 0.00 | 0.00 | 0.00 |
| Example 2 (g) | 0.00 | 120.71 | 0.00 | 0.00 | 0.00 |
| Example 3 (g) | 0.00 | 0.00 | 121.11 | 0.00 | 0.00 |
| Example 4 (g) | 0.00 | 0.00 | 0.00 | 121.70 | 0.00 |
| Example 5 (g) | 0.00 | 0.00 | 0.00 | 0.00 | 120.83 |
| Texanol (g) | 12.43 | 12.47 | 12.43 | 12.41 | 12.45 |
| BYK-022 (g) | 0.13 | 0.13 | 0.13 | 0.13 | 0.13 |
| RM 2020 (g) | 5.02 | 4.37 | 4.47 | 4.28 | 4.49 |
| Water (g) | 23.81 | 23.92 | 23.46 | 23.16 | 23.68 |
| $NH_3$ (g) | 0.20 | 0.20 | 0.18 | 0.19 | 0.15 |
| Total Weight (g) | 528.90 | 529.73 | 528.93 | 528.71 | 529.09 |
| Lipstick Stain | 80 | 80 | 80 | 80 | 50 |

Table 2 shows a marked improvement in lipstick stain removal using the paint examples of the present invention. Although lipstick stain removal is observed in all of the examples, the best results are seen when the core comprises structural units of the hydrophobic monomer.

The invention claimed is:

1. A composition comprising an aqueous dispersion of polymeric microspheres comprising a shell and a core, wherein:
   a) the polymeric microspheres have a $D_{50}$ particle size in the range of from 8 μm to 15 μm, and wherein the microspheres have a coefficient of variation in the range of from 30% to 60%;
   b) the shell comprises at least 90% by weight structural units of methyl methacrylate, and has a surface Young's modulus at 25° C. in the range of from 750 MPa to 1250 MPa, wherein the shell has a $T_g$, in the range of from 95° C. and 110° C.;
   c) the core comprises i) from 0.5 to 20 weight percent structural units of a hydrophobic monomer which is 2-ethylhexyl acrylate, lauryl methacrylate, stearyl methacrylate, or behenyl methacrylate; ii) from 1 to 6 weight percent structural units of allyl methacrylate; iii) from 80 to 98 weight percent structural units of n-butyl acrylate; and iv) less than 4.5 weight percent structural units of a carboxylic acid monomer; wherein the core has a Young's modulus at 25° C. in the range of from 1 MPa to less than 20 MPa;
   d) the weight-to-weight ratio of the core to the shell is in the range of from 8.5:1.5 to 7.5:2.5; and
   e) the shell thickness of the polymeric microspheres is in the range of from 0.2 μm to 1.0 μm.

2. The composition of claim 1 wherein the shell comprises at least 95 weight percent structural units of methyl methacrylate and has a $T_g$ in the range of from 100° C. and 110° C., wherein the polymeric microspheres have $D_{50}$ particle size in the range of from 10 μm to 15 μm.

3. The composition of claim 1 wherein the shell comprises less than 0.1 weight percent structural units of phosphoethyl methacrylate and the core comprises less than 1 weight percent structural units of the carboxylic acid monomer.

4. The composition of claim 3 wherein the shell comprises less than 0.01 weight percent structural units of phosphoethyl methacrylate and the core comprises 0 weight percent structural units of the carboxylic acid monomer.

5. The composition of claim 1 which further comprises at least one component selected from the group consisting of binders, pigments, rheology modifiers, coalescents, defoamers, extenders, opaque polymers, and colorants.

6. The composition of claim 2 which further comprises an acrylic binder, $TiO_2$, a rheology modifier, and a coalescent.

\* \* \* \* \*